US011868494B1

(12) United States Patent
Zhuang et al.

(10) Patent No.: US 11,868,494 B1
(45) Date of Patent: Jan. 9, 2024

(54) SYNCHRONIZATION OF ACCESS MANAGEMENT TAGS BETWEEN DATABASES

(71) Applicant: Amazon Technologies, Inc., Seattle, WA (US)

(72) Inventors: Jing Zhuang, Seattle, WA (US); Uzma Arjuman, Vancouver (CA); Travis William Hickey, Snoqualmie, WA (US); Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 673 days.

(21) Appl. No.: 16/200,348

(22) Filed: Nov. 26, 2018

(51) Int. Cl.
  *H04L 29/08* (2006.01)
  *G06F 21/62* (2013.01)
  (Continued)

(52) U.S. Cl.
  CPC .......... *G06F 21/6218* (2013.01); *G06F 16/22* (2019.01); *G06F 16/27* (2019.01);
  (Continued)

(58) Field of Classification Search
  CPC .......... G06F 21/41; G06F 21/60; G06F 21/62; G06F 21/6218; G06F 16/27; G06F 16/22;
  (Continued)

(56) References Cited

U.S. PATENT DOCUMENTS 5,758,355 A * 5/1998 Buchanan ........... G06F 16/2308
5,974,238 A * 10/1999 Chase, Jr. ........... G06F 12/0815
  710/72
(Continued)

FOREIGN PATENT DOCUMENTS

CN 103377203 A * 10/2013
CN 109074693 A * 12/2018 ......... G07C 9/00039
(Continued)

OTHER PUBLICATIONS

Data management and synchronization in a mobile ad hoc network BY Anu Suneja (Digital Object Identifier 10.1109/MPOT.2011. 2181049) p. 3; Date of publication: Mar. 15 (Year: 2012).*
(Continued)

*Primary Examiner* — Samson B Lemma
*Assistant Examiner* — Ali H. Cheema
(74) *Attorney, Agent, or Firm* — Lowenstein Sandler LLP

(57) ABSTRACT

A method to synchronize tags between two databases comprises receiving a first command to add a tag to a resource in a first database, the tag comprising a key value pair that defines an access privilege associated with the resource. A determination is made that the tag satisfies validation criteria associated with a second database. The tag is stored in the first database, and an entry for the tag is added to a synchronization table, wherein the entry lacks a synchronized flag. A synchronization process is performed between the first database and the second database. A determination is made that the entry of the synchronization table lacks the synchronized flag. A copy of the tag is then written to the second database, and the synchronized flag for the entry in the synchronization table is set.

18 Claims, 10 Drawing Sheets

(51) Int. Cl.
*G06F 21/41* (2013.01)
*G06F 21/60* (2013.01)
*G06F 16/22* (2019.01)
*G06F 16/27* (2019.01)
*G06F 16/23* (2019.01)
*H04L 67/125* (2022.01)
*H04L 67/1095* (2022.01)

(52) U.S. Cl.
CPC ........ *G06F 16/2308* (2019.01); *G06F 16/275* (2019.01); *G06F 21/41* (2013.01); *G06F 21/60* (2013.01); *G06F 21/62* (2013.01); *H04L 67/1095* (2013.01); *H04L 67/125* (2013.01)

(58) Field of Classification Search
CPC .... G06F 16/275; G06F 16/2308; G06F 16/00; G06F 2221/2141; H04L 67/125; H04L 67/1095; H04L 9/0637; H04L 41/0893; G06Q 10/10
USPC ............. 726/17, 28; 707/623, 631, 708, 722
See application file for complete search history.

(56) References Cited

U.S. PATENT DOCUMENTS

| | | | | |
|---|---|---|---|---|
| 6,141,664 A * | 10/2000 | Boothby | ............ | G06F 16/2308 |
| 6,374,262 B1 * | 4/2002 | Kodama | ................ | G06F 16/27 |
| | | | | 707/623 |
| 7,496,606 B2 * | 2/2009 | Hind | ................ | G06F 16/275 |
| 8,447,829 B1 * | 5/2013 | Geller | .................. | H04L 9/3239 |
| | | | | 709/217 |
| 10,938,927 B2 | 3/2021 | Crossley | ................ | G06N 7/01 |
| 2002/0049776 A1 * | 4/2002 | Aronoff | .............. | G06F 16/2358 |
| 2002/0059299 A1 * | 5/2002 | Spaey | ...................... | G06F 16/27 |
| 2007/0255763 A1 * | 11/2007 | Beyerle | ................. | G06F 16/275 |
| 2009/0006499 A1 * | 1/2009 | Mukhi | .................. | G06F 16/275 |
| 2010/0031160 A1 * | 2/2010 | Boyer | ................... | G06F 16/972 |
| | | | | 715/744 |
| 2011/0173294 A1 * | 7/2011 | Jackson | ................. | G06F 16/27 |
| | | | | 709/217 |
| 2011/0314092 A1 * | 12/2011 | Lunt | ..................... | G06F 16/958 |
| | | | | 715/234 |
| 2014/0101102 A1 * | 4/2014 | Baumgarten | ......... | G06F 16/273 |
| | | | | 707/634 |
| 2014/0207824 A1 * | 7/2014 | Brandwine | ......... | G06F 21/6209 |
| | | | | 707/785 |
| 2014/0207861 A1 * | 7/2014 | Brandwine | ............. | H04L 51/52 |
| | | | | 709/204 |
| 2014/0208414 A1 * | 7/2014 | Brandwine | ......... | G06F 21/6218 |
| | | | | 726/17 |
| 2014/0236894 A1 * | 8/2014 | Hoffman | ................. | G06F 9/542 |
| | | | | 707/631 |
| 2015/0302098 A1 * | 10/2015 | Hern | ...................... | G06F 21/41 |
| | | | | 707/708 |
| 2016/0004734 A1 * | 1/2016 | Naryzhny | ............... | G06F 16/22 |
| | | | | 707/736 |
| 2016/0050530 A1 * | 2/2016 | Corbalis | ............ | G06Q 20/3278 |
| | | | | 455/456.1 |
| 2018/0189372 A1 * | 7/2018 | Joiner | .................... | G06Q 10/10 |
| 2019/0132389 A1 * | 5/2019 | Lillie | .................. | H04L 67/1095 |

FOREIGN PATENT DOCUMENTS

| | | | |
|---|---|---|---|
| JP | 2005078237 A | * | 3/2005 |
| JP | 2014178749 A | * | 9/2014 |

OTHER PUBLICATIONS

Apache Ranger: Tag Based Policies Created by Madhan Neethiraj (https://cwiki.apache.org/confluence/display/RANGER/Tag+Based+Policies) p. 9; Dated: Oct. 14 (Year: 2015).*

* cited by examiner

SYNCHRONIZATION OF ACCESS MANAGEMENT TAGS BETWEEN DATABASES

BACKGROUND

Access managers often rely on access control lists to control access to different resources. To be able to gain access, a user's identifier must be listed as an approved user of a resource. The user then typically has to provide some type of credentials, such as a password or token, to gain access to the resource along with their identifier. Although this approach is robust, it can be difficult to manage and lacks flexibility to enable administrators to quickly and easily grant access to new resources and/or update access for existing resources.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
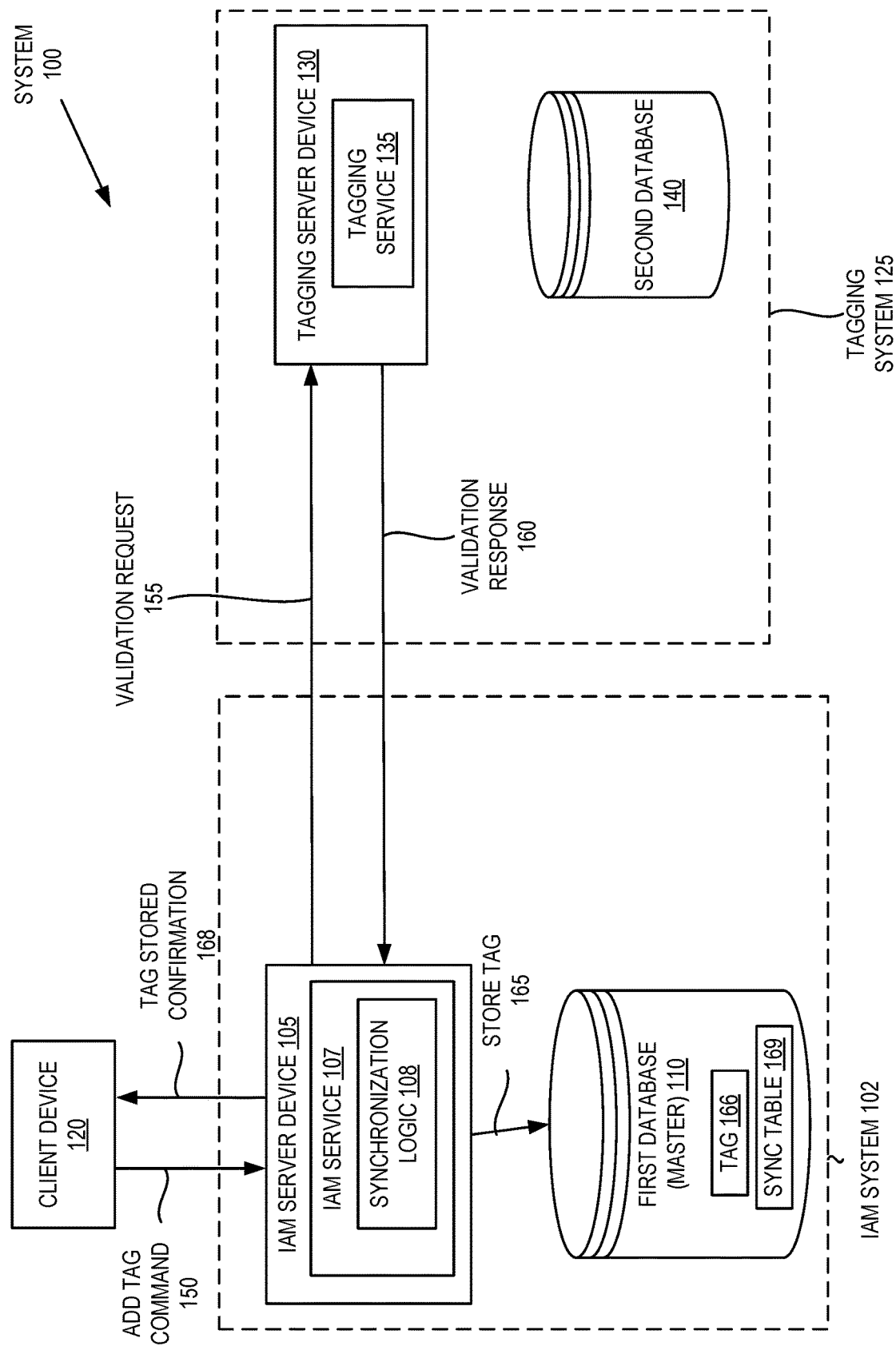
FIG. 1A is a block diagram of an identity access management (IAM) system in communication with a tagging system 125.

This disclosure is directed to synchronization of tags (e.g., such as access management tags) between databases. Embodiments of the disclosure are directed to synchronization of access management tags between an IAM system and a tagging system. The IAM system may include a first database, and the tagging system may include a second database. The tagging system may provide a tagging service for centrally managing resources across multiple other systems (including the IAM system) via the use of tags. For most systems whose resources are managed by the tagging service, a database of the tagging system serves as a master database (a source of truth) about the tags associated with those resources. However, IAM may have stricter security measures, and a database of the IAM system acts as a master database (source of truth) about tags associated with IAM principal resources, such as users, roles and/or groups. Accordingly, in accordance with embodiments described herein, a synchronization scheme is used between the first master database (of the IAM system) and the second database (of the tagging system). Embodiments are discussed with reference between an IAM system and a tagging system. However, the synchronization scheme discussed in embodiments may be used between any two distinct databases in embodiments.

Embodiments address the technical problem of how to enable a tagging system to extend a tagging service to sensitive and/or secure data stored in a database of another system (e.g., such as an IAM system). In embodiments, one or more application programming interfaces (APIs) may be set up for a first system that manages a first database that stores sensitive and/or secure information and/or a second database that stores tags associated with resources in the first database (and optionally resources in other databases). Such APIs may provide processing logic that implements a synchronization scheme to synchronize tags between the first database and the second database. The synchronization scheme may maintain synchronization of tags between the two databases in a manner that avoids race conditions because a single database always includes the final state of all tags. Additionally, the synchronization scheme may maintain synchronization of tags between the two databases in a manner that meets all of the security criteria for the first database (e.g., for a database of an IAM system) and that operates efficiently and quickly. In embodiments, the described synchronization process reduces resource consumption by using a synchronization table and minimizing reads and writes based on entries in the synchronization table without set synchronized flags.

In one embodiment, processing logic receives a first command to add a tag (e.g., an access management tag) to a resource in a first system comprising a first database, the tag comprising a key value pair that may define, for example, an access privilege associated with the resource. The processing logic sends a validation request for the tag to a second system comprising a second database, and receives a validation response after the second system performs one or more validation operations. The validation operations may include comparing the tag (which has yet to be created in either database) to one or more validation criteria of the second system. If any of the validation criteria are not met, the first system receives a negative validation response, and reports an error.

If the validation criteria are met, the first system receives a positive validation response from the second system, wherein the positive validation response indicates that the access management tag satisfies validation criteria of the second system. The processing logic then generates the access tag for the IAM system and stores the tag in the first database. The processing logic additionally adds an entry for the tag in a synchronization table maintained by the first system. The synchronization table may be a table in the first database. The entry for the new tag in the synchronization table may lack a synchronized flag (e.g., have an unset synchronized flag).

At some later time, the processing logic may perform a synchronization process between the first database and the second database. This synchronization process may be performed on a periodic basis, such as every 10 seconds, every 20 seconds, and so on. For the synchronization process, the processing logic may determine entries in the synchronization table that lack the synchronized flag. When an entry lacking the synchronization flag is identified (e.g., the entry for the newly added tag), processing logic writes a copy of that tag to the second database. The synchronized flag for the entry associated with that tag may then be set, indicating that the tag is now synchronized between the two databases.

Once tags have been synchronized between the two systems, those tags may be accessed from either system. For example, a tagging system that includes a copy of tags in an IAM system may include a resource group dashboard that allows customers to centrally access and manage resources for multiple different systems, including an IAM system, using tags. For example, embodiments enable customers to add tags to IAM resources such as IAM users, roles and/or groups, and to access and manage such tags from the resource group dashboard of the tagging system. Thus, embodiments enable customers to authorize access to resources and actions using tags and also to centrally manage their IAM principal resources (e.g., users, roles and/or groups) using a resource group dashboard.

Tags may be used in decisions regarding access of computing resources by users based on tags associated with those users, with roles associated with those users, and/or with groups of users and/or roles. The tags may be assigned to users, to roles, to groups, or to combinations thereof. Principal resources of an IAM system may include users, roles and/or groups. The tags may grant access for users, roles and/or groups (principal resources) to computer resources such as a data storage resource, a database, a compute resource, a streaming resource, and/or a virtual or remote desktop or device, and/or any other type of computing resource.

Tags may be metadata, which may include a key-value pair. For example, a tag may be "project" and a value associated with the tag may be "green". The tag may have other values for different projects, such as "yellow," "orange," and "purple". In some instances, a wildcard value, "*", may be used to represent all values of a tag. In various embodiments, a tag may exist without a value. However, tags typically include values as a key-value pair. Other rules may be implemented for tags, such as a user may not have a same tag with two different values. Such rules may be within a first system (e.g., an IAM system) that maintains a master database of the tags and/or within a second system (e.g., a tagging system) that includes a synchronized secondary database with the tags. Tags may include email addresses, cost centers, project identifiers, location, team name, etc. The value may be a number, letters, or a combination of both. In some embodiments, the values may be limited to certain numbers or bytes, and some numbers and/or letter combinations may be excluded for special use.

Tags may be used to define access privileges of users, roles of the users, and/or groups of roles and/or users. As an example, a user may have a cost center tag with a value 1234 ("CostCenter":1234). A particular computer resource, such as a data storage location, may have an access requirement that requires users to have the tag/value "CostCenter":1234 in order to gain access to the data in the data storage. Thus, a user must have both the tag ("CostCenter") and the value of this tag (1234) to gain access. A user that does not have this tag, or has the tag, but has a different value (e.g., 4567), would be denied access. Other tag conditions may be used to determine access, as discussed below in various examples.

Tags may be granted to users by administrators or other authorized users, possibly in accordance with tagging policies. For example, an administrator may create a new user and add tags to that new user. An administrator may also remove tags, modify tags or tag values, and/or add tags to an existing user. In some embodiments, a user may assume a role, and may be provided tags for the role on a temporary or permanent basis. For example, a user may be placed on a project for a short time and may require access for that project, via a new role, for that time period.

An access management system may deploy an IAM service to create and use tags in these ways described above and in many other ways (some of which are described below) to control access for principal resources of an IAM system. The IAM service may include synchronization logic, as described in greater detail below, that synchronizes such tags with a tagging system or other secondary system.

The techniques and systems described herein may be implemented in a number of ways. Example implementations are provided below with reference to the following figures.

Figure 1B:
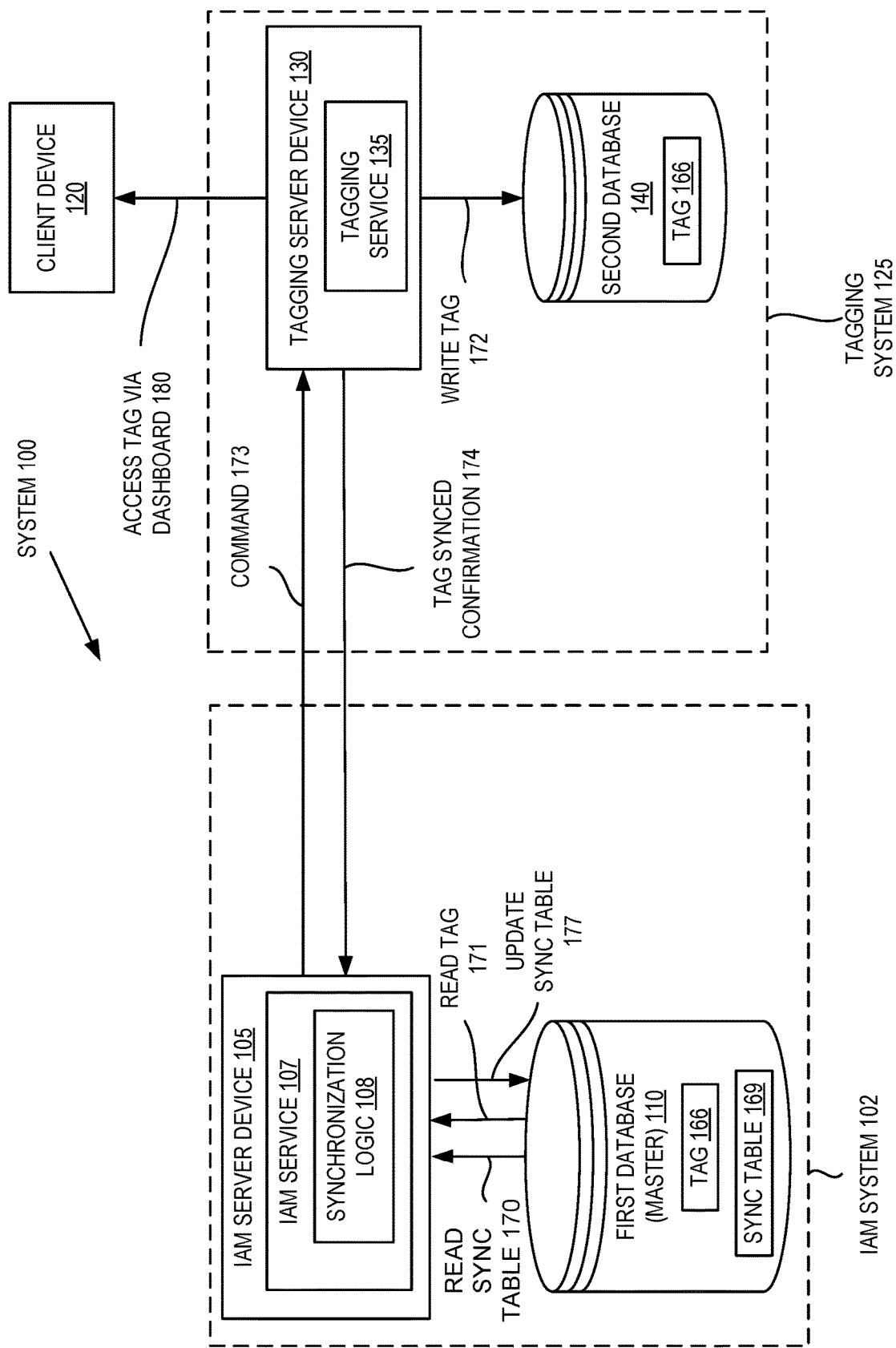
FIG. 1B is a block diagram of a synchronization process between a first database of the IAM system and the tagging system of FIG. 1A.

FIGS. 1A-1B are block diagrams of a system 100 that includes a connected IAM system 102 and tagging system 125. FIG. 1A is a block diagram of the IAM system 102 in communication with the tagging system 125 showing storage of a tag in the IAM system 102. FIG. 1B is a block diagram of a synchronization process between a first database 110 of the IAM system and a second database 140 of the tagging system of FIG. 1A.

The IAM system 102 includes one or more IAM server devices 105 connected to a first database 110, which may be a master database. The IAM server device 105 may include physical machines and/or virtual machines and/or other virtual resources (e.g., containers) hosted by physical machines. The physical machines may be rackmount servers, desktop computers, or other computing devices. The virtual machines and/or containers may be managed and provided by a cloud provider system. Each virtual machine offered by a cloud service provider may be hosted on a physical machine configured as part of a cloud. Such physical machines are often located in a data center. The first database 110 may be any type of relational or non-relational database.

The IAM system 102 may additionally include one or more additional read replica databases (not shown). Contents of the first database 110 may be copied to the one or more read replica databases, which may contain copies of the first database. Reads may then be performed on one or more of the read replica databases rather than on the first database 110 to reduce a load on the first database 110.

The IAM server device 105 may execute an IAM service 107. The IAM service 107 may perform standard IAM operations, such as creating and managing users, roles, groups, permissions, and so on. The IAM service 107 may additionally include logic that is configured to create and use access management tags for users, roles and/or groups (e.g., principal resources). The IAM service 107 may create tags, modify tags, remove tags, and/or use tags to determine access privileges and/or other information. The IAM service 107 implements attribute based access control based at least in part on tags of the users, the roles and/or the groups, rather than using identity access control that relies on access control lists for specific resources (e.g., a whitelist of user identifiers for a particular resource). By using tags, administrators and possibly other users can easily manage access to computer resources by adding, removing, or changing tags of users, roles and/or groups.

The IAM service 107 may include or have access to user profiles and/or computer resource profiles, which may include tags. Thus, tags may be assigned to users, to computer resources, to roles and/or to groups. Tags may be metadata, which may include a key-value pair. For example, a tag may be "project" and a value associated with the tag may be "green" or "1000" (among other possible values, possibly with some limitations). The tag may have other values for different projects, such as "yellow," "orange," and "purple". In some instances, a wildcard value, "*", may be used to represent all values of a tag, which may be used in queries or access controls, etc. In various embodiments, a tag may exist without a value. However, tags typically include values as a key-value pair. Other rules may be implemented for tags, such as a user may not have a same tag with two different values. Tags may include email addresses, cost centers, project identifiers, location, team name, etc. The value may be a number, letters, or a combination of both. In some embodiments, the values may be limited to certain numbers or bytes, and some numbers and/or letter combinations may be excluded for special use.

The IAM service 107 may authorize access by user devices associated with respective users, roles and/or groups to computing resources, via one or more networks, such as wired and/or wireless networks. The users, roles and/or groups may be associated with tags and tag values, which may be stored and retrieved from the user profiles or other principal resource profiles. Likewise, the computing resources may be associated with tags and tag values, which may be stored and retrieved from computing resource profiles. In some embodiments, the computing resource profiles may include access rules for accessing the computing resource, which may require certain tags to be associated with users to allow those users to access the resource. The tags required of a user to access a computing resource may be the same tags as the computing resource or different tags, depending on the access rules for a given computing resource, for example.

In an example, a first user may include a tag/value pair of "Project":Green and "CostCenter":123. A second user may include a tag/value pair of "Project":Green and "CostCenter":456. A last user may include a tag/value pair of "Project":Red and "CostCenter":789. A first computing resource may include a tag/value pair of "Project":"*" and "CostCenter":123, where "*" is a wildcard and represents all projects. Here, this wildcard may be used as a condition for access, but not as an actual tag in some instances since a tag may not be allowed to have more than one value. A second resource may include a tag/value pair of "Project":Green and "CostCenter":"*". A last resource may include a tag/value pair of "Project":Red and "CostCenter":789.

The IAM service 107 may determine which users may access which of the computing resources based on tags of the user and/or tags or tag conditions of the computing resources. A tag condition may be different than a tag. For example, a resource may have a tag "Project":Green, but a tag condition of "Project":"*" which requires a user to have a project tag, but no specific tag value for that project tag.

In the above example, the IAM service 107 may allow the first user to access the first resource since the first user includes a "project" tag and includes a "CostCenter" tag having a tag value of 123. The IAM service 107 may allow the first user to also access the second resource since the first user includes a "project" tag with the value "Green" and includes a "CostCenter" tag. The IAM service 107 may deny access by the first user to the last resource since the first user does not have the "Project" tag value of "Red", but instead has a "Project" tag value of "Green".

Continuing with the above example, the IAM service 107 may allow the second user to access the second resource since the second user includes a "project" tag value of "Green" and includes a "CostCenter" tag. The IAM service 107 may deny access by the second user to the first resource and the last resource since the second user does not have the "CostCenter" tag value of "123", and because the second user does not have the "Project" tag value of "Red", respectively.

Continuing with the above example, the IAM service 107 may allow the last user to access the last resource since the last user includes a "project" tag value of "Red" and includes a "CostCenter" tag value of 789. The service may deny access by the last user to the first resource and the second resource since the last user does not have the "CostCenter" tag value of "123", and because the last user does not have the "Project" tag value of "Green", respectively.

As discussed above, user tags may be granted to users by administrators or other authorized users. For example, an administrator may create a new user and add tags to that new user. An administrator may also remove tags, modify tags or tag values, and/or add tags to an existing user, role and/or group. In some embodiments, a user may assume a role, and may be provided tags for the role on a temporary or permanent basis. For example, a user may be placed on a project for a short time and may require access for that project, via a new role, for that time period.

Computing resource tags may be granted to computing resources by users, administrators, and/or creators of the resources, depending on requirements for these tags. The tags of computing resources may be the same or similar to the tags of the users, roles and/or groups. For instance, a data storage may include a tag of "CostCenter":1234. In some embodiments, a computing resource that is created may be automatically tagged with one or more tags based on tags of a creator of the computing resource, sometimes referred to as "painting" of tags. By adding tags to computing resources in this way, a creator may easily group computing resources and costs of those computing resource may be easily attributed to a user or other principal resource (e.g., having the same tag as the computing resource).

Although some examples herein describe computing resources to have tags, this is not required. The techniques and systems may be performed where principal resources (e.g., users, roles and/or groups) have tags, and computing resources include tag conditions. The computing resources do not need to have tags to create tag conditions. However, when computing resources have tags, those tags may be used when determining access in some embodiments.

The IAM service 107 includes synchronization logic 108 that synchronizes tags in the first database 110 of the IAM system 102 with corresponding tags in a second database 140 of a tagging system 125. The tagging system 125 may include one or more tagging server device 130 and a second database 140. The tagging server device 130 may include physical machines and/or virtual machines and/or other virtual resources (e.g., containers) hosted by physical machines. The physical machines may be rackmount servers, desktop computers, or other computing devices. The virtual machines and/or containers may be managed and provided by a cloud provider system. The second database 140 may be any type of relational or non-relational database. In one embodiment, the second database 140 is a non-relational database. In one embodiment, the second database 140 is a No-SQL database. In one embodiment, the second database 140 is a DynamoDB database.

The synchronization logic 108 may perform one or more operations prior to creation of a new tag to ensure that the new tag will satisfy validation criteria of the tagging service 135. In one embodiment, the synchronization logic 108 includes one or more APIs that may call on APIs of the tagging service 135 to perform validation of a new tag prior to creating that new tag. The synchronization logic 108 may additionally perform one or more operations to synchronize tags between the first database 110 and the second database 140. One example of tag creation and storage on the first database 110 is discussed with reference to FIG. 1A. One example of tag synchronization between the first database 110 and second database 140 is discussed with reference to FIG. 1B.

Turning now to FIG. 1A, a client device 120 may use an API of the IAM service 107 to provide a command 150 to add a new tag (or to modify an existing tag, delete a tag, or delete a principal resource to which a tag is attached) in the IAM system 102. The command 150 may identify a principal resource (e.g., user, role or group) to associate the tag with, a name of the tag and/or a value of the tag. A command may also be a create user command, create group command or create role command, and may indicate one or more tags to create for the new user, role and/or group. IAM service 107 may include different create user, create role, tag user, tag role, untag user, untag role, create group, tag group, untag group and/or modify tag APIs, for example. Responsive to receiving the command 150, the synchronization logic 108 may generate a validation request 155 and send the validation request to tagging service 135. In one embodiment, synchronization logic 108 calls an API (e.g., a put proposed resource API) of the tagging service 135 for the validation request 155. As part of the validation request 155, synchronization logic 108 may pass to tagging service 135 information from the command 150 (e.g., such as a tag name, a user name, a role name, a group name, a tag value, and so on).

The tagging service 135 performs one or more validation operations based on the validation request 155 to determine if the tag (which may be a new tag or a modified tag) will satisfy one or more validation criteria of the tagging service 135. In one embodiment, a role, group or user may have at most a maximum number of tags. Tagging service 135 may include a first rule that is used to check the number of tags associated with a user, group or role. If addition of the new tag will cause the total number of tags associated with the user, group or role to exceed the maximum number of tags (tag threshold), then validation of the tag may fail. Tagging service 135 may include a valid characters rule that is used to check the proposed name and/or value for a tag. If the proposed name and/or value include non-valid characters (e.g., $, %, etc.), then validation of the tag may fail. Tagging service 135 may additionally include any number of administrator added rules, which may govern the validity of tags. Tagging service 135 may apply the rules to the received information in the validation request 155 to determine if the tag is successfully validated. Once validation of the tag is complete, the tagging service 135 returns a validation response 160 to the synchronization logic 108. If the validation response is a positive validation response, then the validation response may include a validation token.

Responsive to receiving a positive validation response (which may include a validation token), the synchronization logic 108 may generate a new tag and store/write 165 the new tag 166 to the first database 110. Alternatively, if the initial command was a modify tag command, then the synchronization logic may modify an existing tag in the first database 110. Synchronization logic may additionally store a received validation token in the first database 110. The validation token may be associated with the tag 166 in the first database 110. Synchronization logic 108 additionally updates a synchronization table 169, which may be stored in the first database 110 or in additional database. If the synchronization table 169 is stored in the first database 110 that also stores the tags (e.g., tag 166), then the synchronization table and one or more tags may be updated in a single transaction without using a complex transactional middleware between systems. The synchronization table 169 may include an entry for each tag in the first database 110, and may be used to determine which tags in the first database 110 are synchronized with the second database 140 as well as which tags in the first database 110 still need to be synchronized with the second database 140. When a tag is added to the first database, an entry for that tag may be added to the synchronization table 169. When a tag in the first database is modified, then the entry for that tag in the synchronization table 169 may be modified. The synchronization table 169 may include a synchronized flag that is used to determine which tags have been synchronized between the first database 110 and the second database 140. The synchronized flag may be unset for new entries associated with newly added tags as well as for entries associated with modified tags. Synchronization logic 108 may then return a tag stored confirmation 168 to the client device 120.

Responsive to receiving a negative validation response, synchronization logic 108 may return an error to the client device 120. The error may or may not indicate which validation rules of the tagging service 135 were violated.

Notably, in embodiments the synchronization logic 108 performs operations to facilitate synchronization even before tags are added to the first database or updated in the first database 110. This ensures that once synchronization is performed such synchronization does not result in tags in the second database 140 that violate rules of the tagging service 135.

Referring now to FIG. 1B, periodically synchronization logic 108 performs synchronization operations to synchronize tags between the first database 110 and second database 140. Such synchronization operations may be performed on a periodic basis, such as every 1 second, 5 seconds, every 10 seconds, or at some other interval. To perform synchronization, synchronization logic 108 reads 170 the synchronization table 169 to identify one or more entries with unset synchronized flags. Once an entry in the synchronization table 169 with an unset synchronized flag is identified, synchronization logic 108 may read 171 that tag from the first database 110, and may then send a command 173 to the tagging service 135 to write that tag to second database 140. The command may include the validation token that was previously provided by the tagging service 135.

Synchronization logic 108 may call an API (e.g., a put resource API) of the tagging service 135 for the command 173. The command 173 may include one or more strings, such as strings containing a tag name, a tag value, a resource name, the validation token, and so on.

The validation token may include a time stamp indicating a time/date at which the tagging system performed a successful validation of a tag. The validation rules associated with tags may change between a time when validation is performed on a tag (before the tag is added to the first database) and a time when the tag is synchronized to the second database. However, the tagging service 135 may honor previous successful validations based on the validation tags. Accordingly, even if validation conditions change, as long as a tag was previously validated, the validation token that was generated by that tag may be used to add that tag to the second database 140 (or to update that tag in the second database 140). This can mitigate or eliminate race conditions between the first database 110 and the second database 140.

In one embodiment, the first database 110 and second database 140 are different types of databases, which may have different schemas and/or use different data formats. Accordingly, a called API of the tagging service 135 may perform one or more operations to transform the tag from a first format used by the first database 110 to a second format used by the second database 140. Alternatively, such transformation operations may be performed by the synchronization logic 108 prior to sending the command 173.

Tagging service 135 writes 172 the tag 166 to the second database 140, which causes the tag to be synchronized between the first and second databases. Tagging service 135 may then send a tag synced confirmation 174 to the synchronization logic 108. Synchronization logic 108 may then update the synchronization table 169 by setting the synchronized flag for the entry associated with the tag 166.

Once tags are synchronized between the IAM system 102 and the tagging system 125, a client device 120 may access the tagging service 135 (e.g., a dashboard provided by the tagging service 135) to view, access, modify, etc. 180 the tags. If a command to modify a tag is received by the tagging service 135, tagging service 135 may use an API of the IAM service 107 to modify the tag as described with reference to FIG. 1A.

Figure 2:
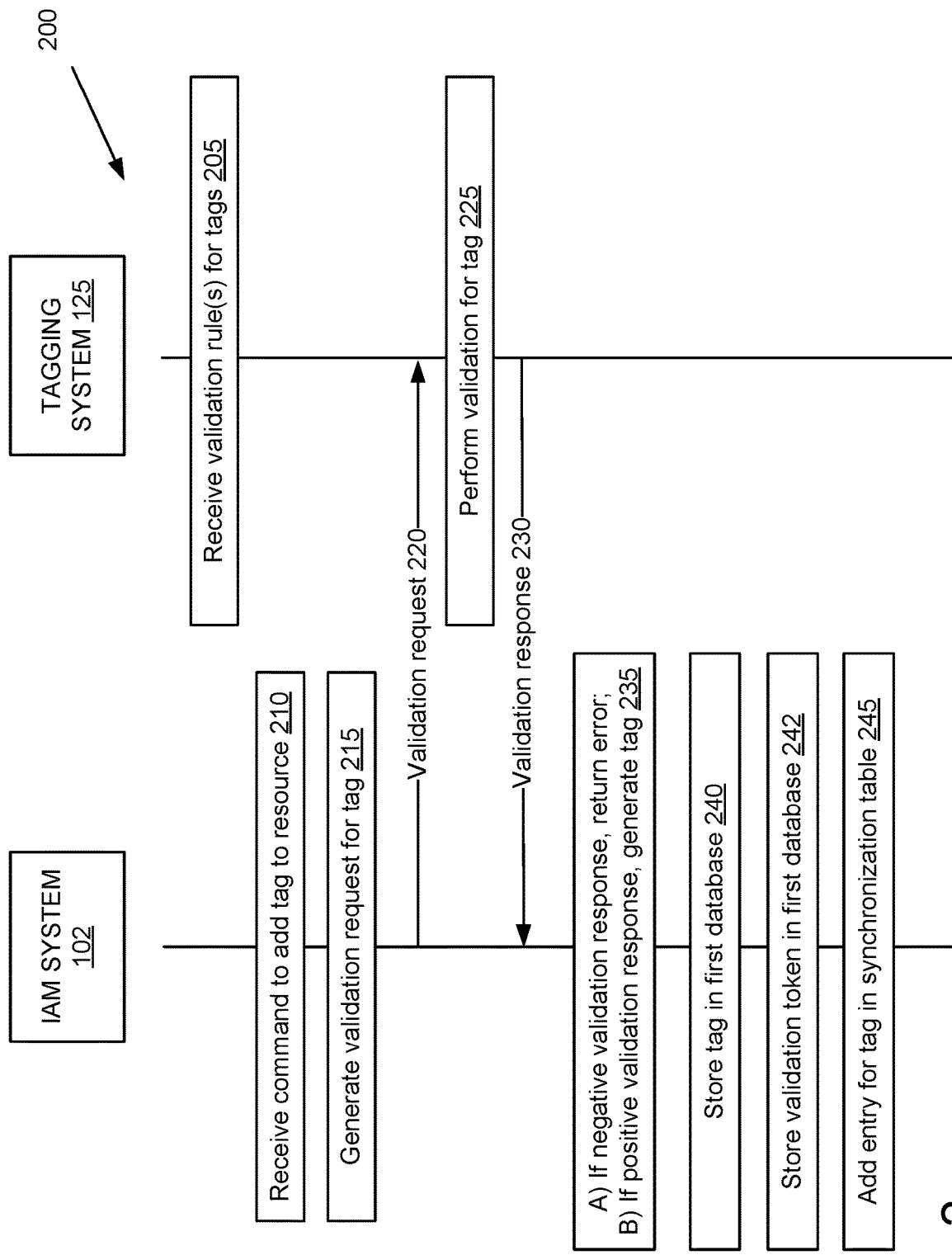
FIG. 2 is a flow diagram of an illustrative process to create tags for resources in an IAM system, in accordance with one embodiment.

FIG. 2 is a sequence diagram of an illustrative method 200 to create tags for resources in an IAM system, in accordance with one embodiment. The sequence diagram shows operations of an IAM system 102 and a tagging system 125. However, other pairs of systems may also perform the operations set forth herein.

At block 205 of method 200, the tagging system 125 may receive one or more validation rules for tags. The validation rules may include default validation rules (which may be defined by the tagging system 125) and/or may include customer generated validation rules.

At block 210, the IAM system receives a command to add a tag to an existing resource, or to generate a new resource that will include a tag. In either instance, the IAM system 102 may generate a validation request for the new tag. The validation request may include information about the tag, such as a tag name, a tag value, a resource associated with the tag, and so on. At block 220, the IAM system 102 sends the validation request to the tagging system 125.

At block 225, the tagging system 125 performs validation for the tag 166. This may include checking the data for the tag against the one or more validation rules received at block 205. At block 230, the tagging system 125 sends a validation response to the IAM system 102. The validation response may include a validation token, which may include a timestamp indicating when the tag was validated.

At block 235, the IAM system determines whether the validation response is a positive validation response (successful validation) or a negative validation response (unsuccessful validation). If the validation response is negative, an error or exception is returned to a user that issued the command to add the tag to the resource. If the validation response is positive, then that tag is generated. At block 240, the tag is then stored in the first database of the IAM system 102. At block 242, the validation token may be stored in the first database. At block 245, an entry for the tag is added to a synchronization table. The entry will include an unset synchronized flag (e.g., an unset bit associated with synchronized flag field).

Figure 3:
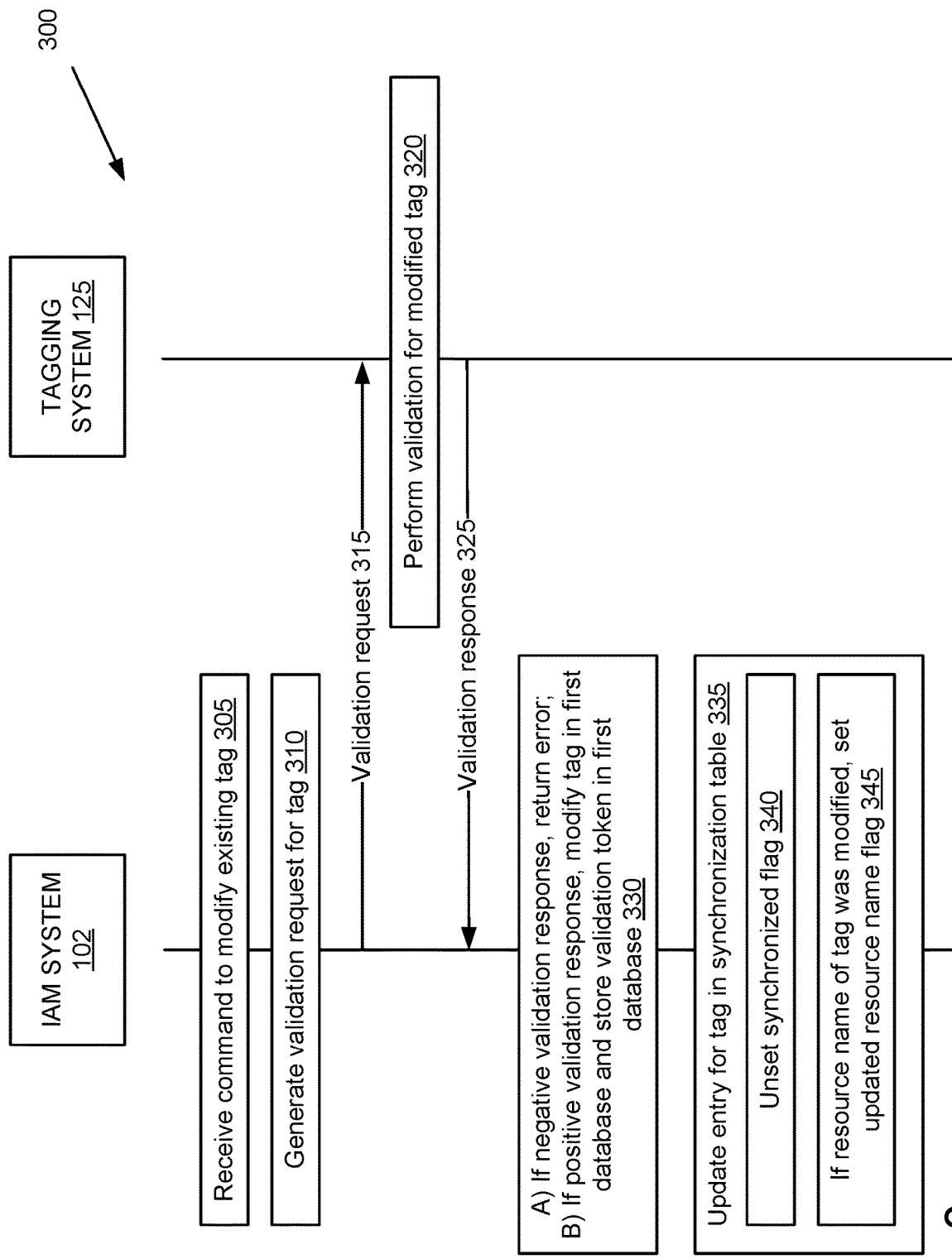
FIG. 3 is a flow diagram of an illustrative process to modify tags for resources in an IAM system, in accordance with one embodiment.

FIG. 3 is a sequence diagram of an illustrative method 300 to modify tags for resources in an IAM system, in accordance with one embodiment. The sequence diagram shows operations of an IAM system 102 and a tagging system 125. However, other pairs of systems may also perform the operations set forth herein.

At block 305 of method 300, the tagging system 125 may receive a command to modify an existing tag. The command may be a command to modify a name of the tag (e.g., a resource name field value), to modify a value of the tag, or to modify some other property of the tag. The IAM system 102 may generate a validation request for the new tag at block 310. The validation request may include information about the tag in its modified form, such as a tag name, a tag value, a resource associated with the tag, and so on. At block 315, the IAM system 102 sends the validation request to the tagging system 125.

At block 320, the tagging system 125 performs validation for the modified tag. This may include checking the data for the modified tag against the one or more validation rules. At block 325, the tagging system 125 sends a validation response to the IAM system 102. The validation response may include a validation token.

At block 330, the IAM system 102 determines whether the validation response is a positive validation response (successful validation) or a negative validation response (unsuccessful validation). If the validation response is negative, an error or exception is returned to a user that issued the command to modify the tag. If the validation response is positive, then that tag may be modified in the first database of the IAM system 102 and the validation token may be stored in the first database.

At block 335, the IAM system 102 updates the entry for the tag in the synchronization table. This includes at block 340 unsetting a synchronized flag for the entry associated with the tag to indicate that the tag is no longer synchronized with the second database of the tagging system 125. Additionally, at block 345 processing logic may determine if a name (e.g., a resource name field) of the tag was modified. The first database of the IAM system 102 may include an identifier field that is not included in the second database and a name field (e.g., a resource name field) that is included in the second database. The first database may use the value of the identifier field to uniquely identify a tag. However, the tagging system may use the value of the name field to uniquely identify a tag. Accordingly, values for the name field are unique in the second database but are not unique in the first database in some embodiments. To address this, the synchronization table may include an updated resource name field. Each entry in the synchronization table may have an updated resource name flag set or unset. At block 345 processing logic may set the updated resource name flag if the resource name of the tag was modified. During synchronization, a different sequence of operations may be performed for a tag based on whether or not the updated resource name flag is set for the entry associated with that tag.

Figure 4:
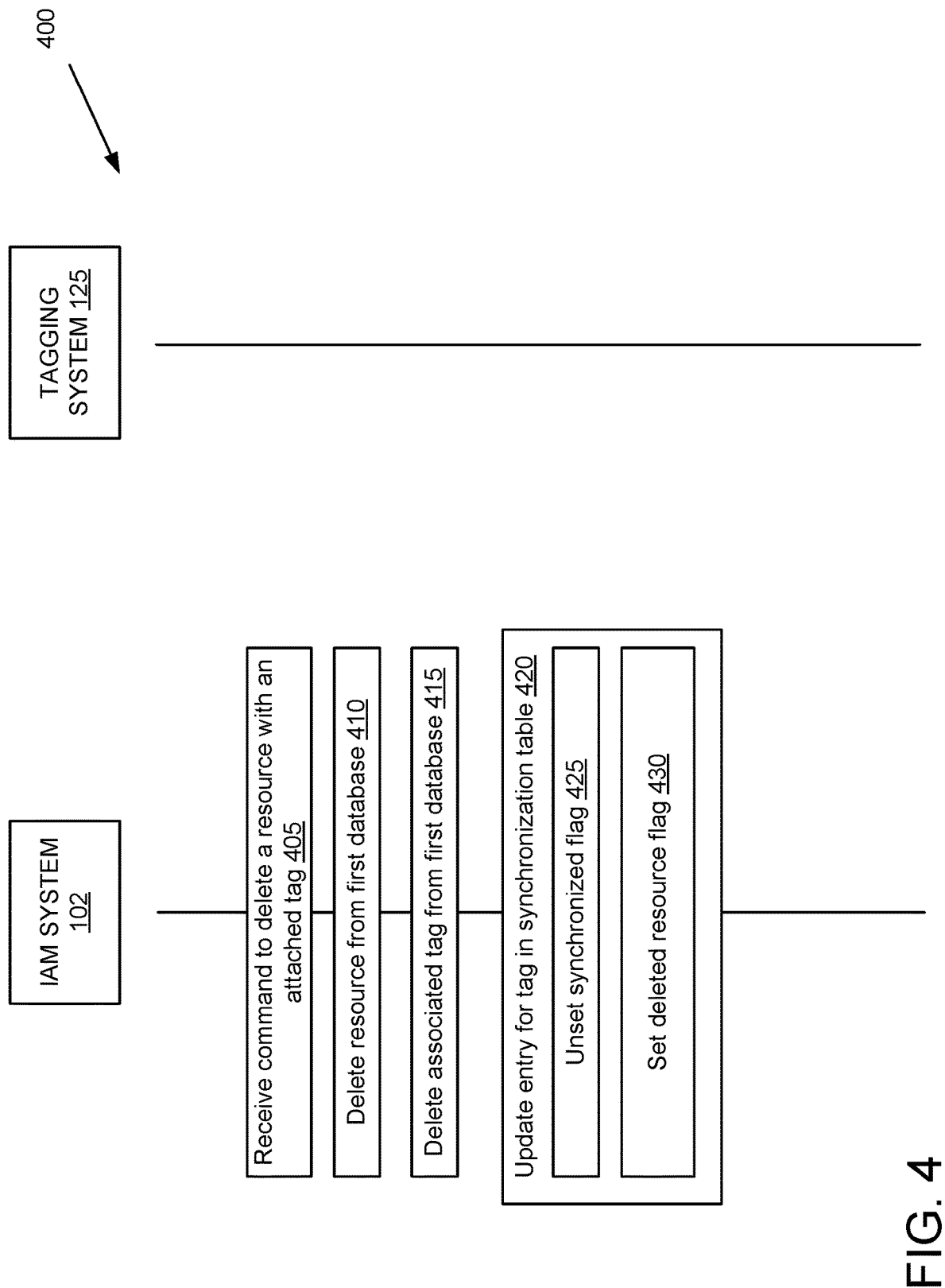
FIG. 4 is a flow diagram of an illustrative process to delete resources and associated tags in an IAM system, in accordance with one embodiment.

FIG. 4 is a sequence diagram of an illustrative method 400 to delete resources and associated tags in an JAM system, in accordance with one embodiment. The sequence diagram shows operations of an JAM system 102 and a tagging system 125. However, other pairs of systems may also perform the operations set forth herein.

At block 405, the JAM system 102 receives a command to delete a resource with an attached tag. At block 410, the JAM system deletes the resource from the first database. At block 415, the JAM system deletes the associated tag from the first database. At block 420, the JAM system updates an entry for the tag in the synchronization table. This may include unsetting a synchronized flag for that entry at block 425. Additionally, at block 430 the JAM system 102 may set a deleted resource flag for the entry. The set deleted resource flag may cause the tag to be deleted from the second database of the tagging system 125 during synchronization.

In an alternative embodiment, JAM system may receive a command to delete a tag at block 405. In such an embodiment, the operations of block 410 may be omitted, and the operations of block 415 and block 420 may be performed for the specified tag.

Figure 5:
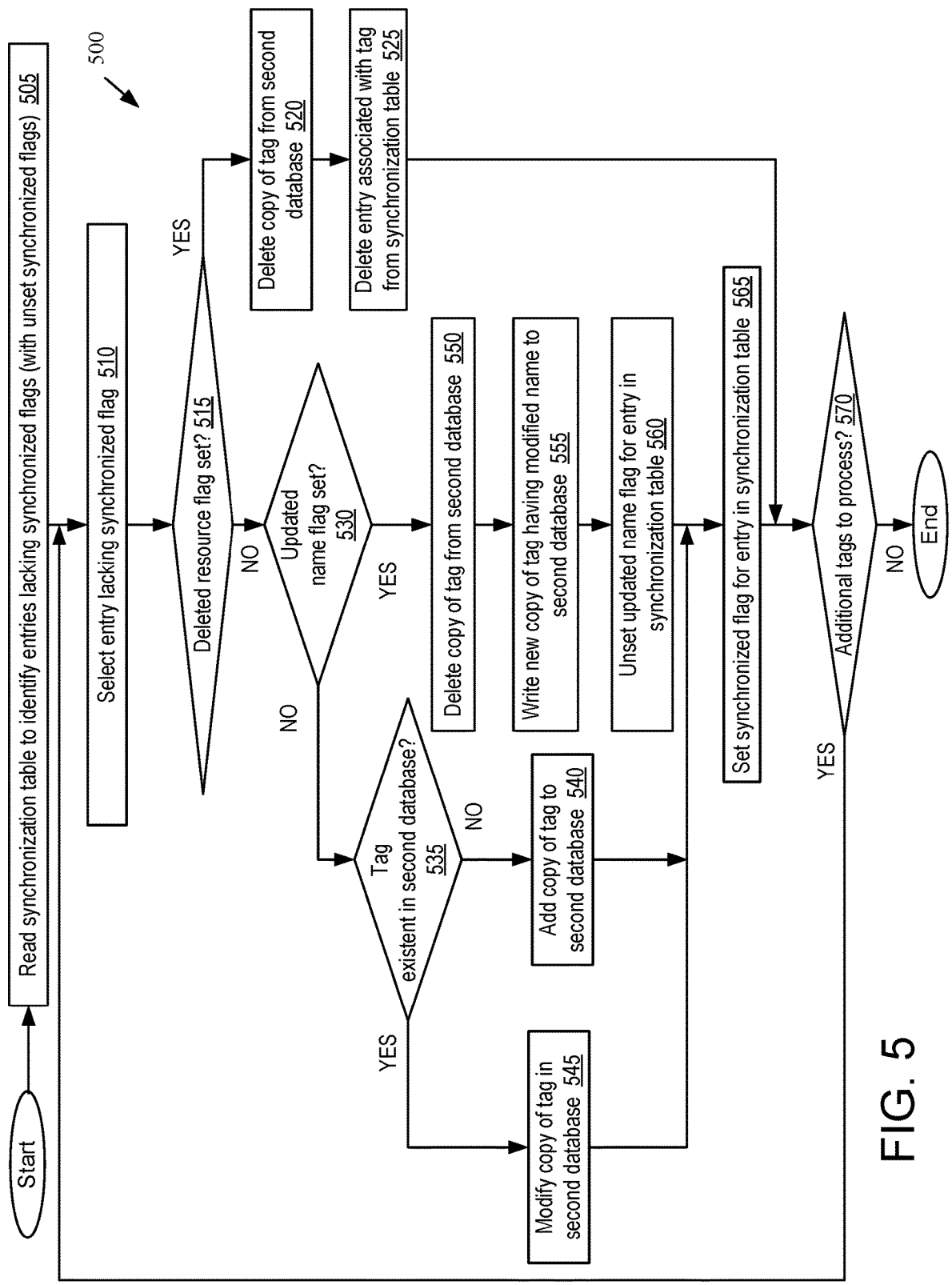
FIG. 5 is a flow diagram of an illustrative process to synchronize tags between two separate databases, in accordance with one embodiment.

FIG. 5 is a flow diagram of an illustrative method 500 to synchronize tags between two separate databases, in accordance with one embodiment. The method may be performed by a processing logic that may comprise hardware (e.g., circuitry, dedicated logic, programmable logic, microcode, etc.), software (e.g., instructions run on a processing device to perform hardware simulation), or a combination thereof. The processing logic may execute on one or many processing devices in a cloud environment. Where the processing logic is distributed across multiple processing devices, each of the processing devices may perform one or more of the operations for a method. The processing logic may correspond to one or more of synchronization logic 108 and/or tagging service 135 in embodiments.

Method 500 may be performed periodically. Additionally, prior to execution of method 500, processing logic may determine a number of threads to instantiate to perform method 500. The number of threads to instantiate may be based on a number of tags to be updated. In one embodiment, method 500 is performed at an interval of 10 seconds. Accordingly, each thread should be able to complete all assigned synchronization operations in less than 10 seconds in such an embodiment. If, for example, each thread is able to process 15 tags per second, then 10 threads would be able to process 1500 tags every 10 seconds. In one embodiment, if a given thread exceeds the designated interval (e.g., 10 seconds) in execution time, then a next thread with a same request identifier may not start until the first thread with that request identifier is finished.

An instantiated thread may begin method 500 at block 505, at which processing logic reads a synchronization table to identify one or more entries lacking synchronized flags (with unset synchronized flags). At block 510, processing logic selects an entry from the synchronization table that lacks a set synchronized flag.

At block 515, processing logic determines whether the selected entry includes a set deleted resource flag. If the entry includes a set deleted resource flag, the method continues to block 520. If the entry does not include a set deleted resource flag, the method proceeds to block 530.

At block 520, processing logic deletes a copy of the tag associated with the selected entry from the second database (e.g., the database of the tagging system). This may be performed by calling a API of the tagging system to delete the tag. At block 525, processing logic deletes the entry associated with the deleted tag from the synchronization table. The method then proceeds to block 570.

At block 530, processing logic determines whether an updated name flag is set for the selected entry. As discussed above, in some embodiments, the first database of the IAM system 102 may include an identifier field that is not included in the second database of the tagging system 125 and a name field (e.g., a resource name field) that is included in the second database. The first database may use the value of the identifier field to uniquely identify a tag. However, the tagging system may use the value of the name field to uniquely identify a tag. Accordingly, values for the name field are unique in the second database but are not unique in the first database in some embodiments. To address this, the synchronization table may include an updated resource name field. Each entry in the synchronization table may have an updated name flag set or unset. If the updated name flag is set, the method continues to block 550. If the updated name flag is not set, the method proceeds to block 535.

At block 535, processing logic determines whether the tag is existent in the second database. If the tag is existent in the second database, the method continues to block 545. If the tag is not existent in the second database, the method continues to block 540. Alternatively, in some embodiments block 535 may be omitted, and the same command may be sent to the system that controls the second database regardless of whether a tag was recently added or recently modified.

At block 545, processing logic modifies a copy of the tag in the second database. This may be performed by calling an API of the tagging system, for example, and providing the API with a validation token and information on the modified tag. At block 540, processing logic adds a copy of the tag to the second database. This may also be performed by calling an API of the tagging system, for example, and providing the API with a validation token and information on the new tag.

At block 550, processing logic deletes the copy of the tag from the second database (e.g., by calling an appropriate API of the tagging system). At block 555, processing logic writes a new copy of the tag having the modified name to the second database. Accordingly, the same tag may be maintained in the first database (though with a modified name), but a new tag may be generated in the second database and mapped to the tag in the first database. At block 560, processing logic may unset the updated name flag for the entry in the synchronization table.

At block 565, processing logic sets the synchronized flag for the entry in the synchronization table. This indicates that the tag associated with the entry is now synchronized between databases. The method then continues to block 570. At block 570, processing logic determines whether there are any additional tags to process by the thread performing method 500. If so, the method returns to block 510 and another entry lacking a synchronized flag is selected. If all of the tags allocated to the thread have been processed, the method ends.

Figure 6:
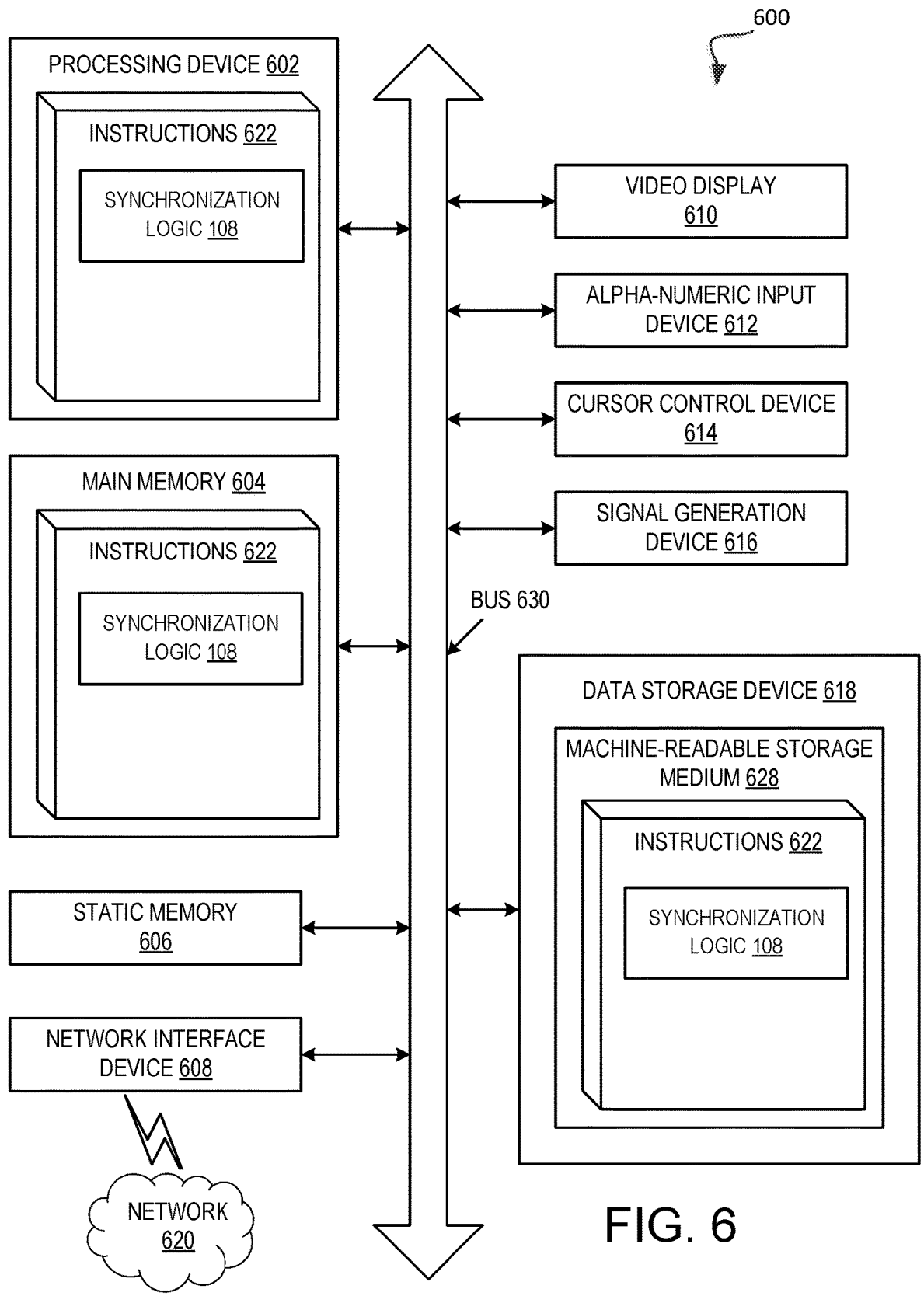
FIG. 6 is a schematic block diagram that provides one example illustration of a computing device executing a synchronization service, according to one embodiment of the present disclosure.

FIG. 6 illustrates a diagrammatic representation of a machine in the exemplary form of a computer system (computing device) 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. The system may be a single compute node in an on-demand configurable pool of shared computing resources in some embodiments. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, compute node, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (e.g., a processor) 602, a main memory device 604 (e.g., read-only memory (ROM), flash memory, dynamic random access memory (DRAM) such as synchronous DRAM (SDRAM)), a static memory device 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for synchronization logic 108 (e.g., APIs) for performing the operations discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions of synchronization logic 108 embodying any one or more of the methodologies or functions described herein. The instructions may also reside, completely or at least partially, within the main memory 604 and/or within processing logic of the processing device 602 during execution thereof by the computer system 600, the main memory 604 and the processing device 602 also constituting computer-readable media.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 7:
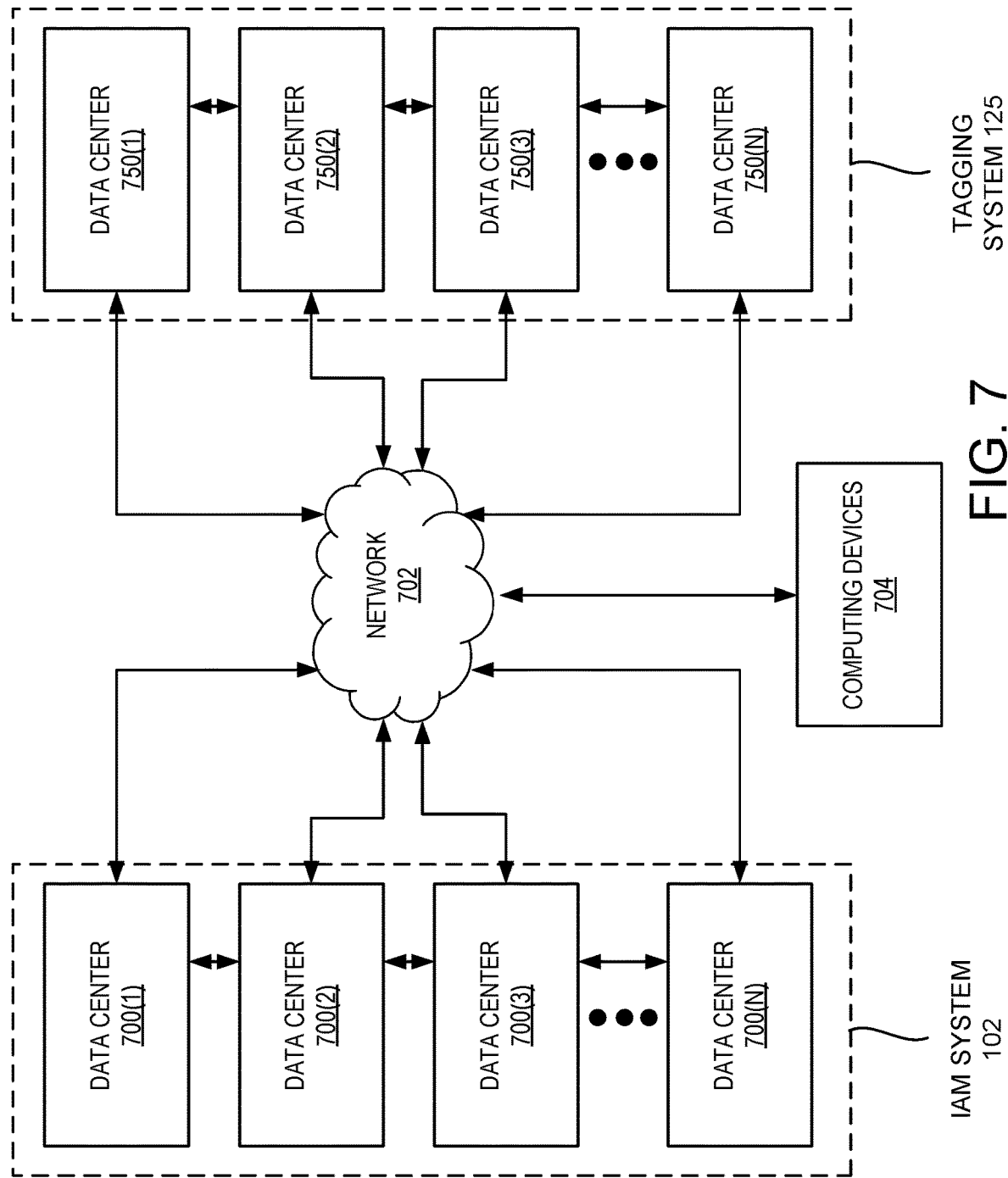
FIG. 7 is a system and network diagram that shows an illustrative operating environment that includes an IAM system in communication with a tagging system over a network.

FIG. 7 is a system and network diagram that shows an illustrative operating environment that includes an IAM system 102 in communication with a tagging system 125 over a network 702. The systems can execute network services, such as the data storage and data streaming, and/or provide computing resources on a permanent or an as-needed basis. Among other types of functionality, the computing resources provided by the systems, or by a larger system of which the system is a part, can be utilized to implement various network services, tagging services, synchronization services and/or IAM services described herein. As also discussed above, the systems may be part of a larger system that provides additional computing resources that include, without limitation, data storage resources, data processing resources, such as virtual machine (VM) instances, networking resources, data communication resources, network services, and other types of resources.

Each type of computing resource provided by either system, or by a larger system of which the systems may be a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The systems, or a larger system of which the systems are a part, can also be configured to provide other types of computing resources not mentioned specifically herein.

The computing resources provided by the systems, or a larger system of which the systems are a part, are enabled in one implementation by one or more data centers 700(1), 700(2), 700(3), . . . , 700(N) for the IAM system 102 and by one or more data centers 750(1), 750(2), 750(3), . . . , 750(N) for the tagging system 125. The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 8.

The users of the systems can access the computing resources provided by the systems over network 702, which can be a wide area communication network ("WAN"), such as the Internet, an intranet or an Internet service provider ("ISP") network or a combination of such networks. For example, and without limitation, a computing device 704 (e.g., the client device 120) operated by a user of the system can be utilized to access the system by way of the network 702. It should be appreciated that a local-area network ("LAN"), the Internet, or any other networking topology known in the art that connects the data centers to remote users and other users can be utilized. It should also be appreciated that combinations of such networks can also be utilized.

Figure 8:
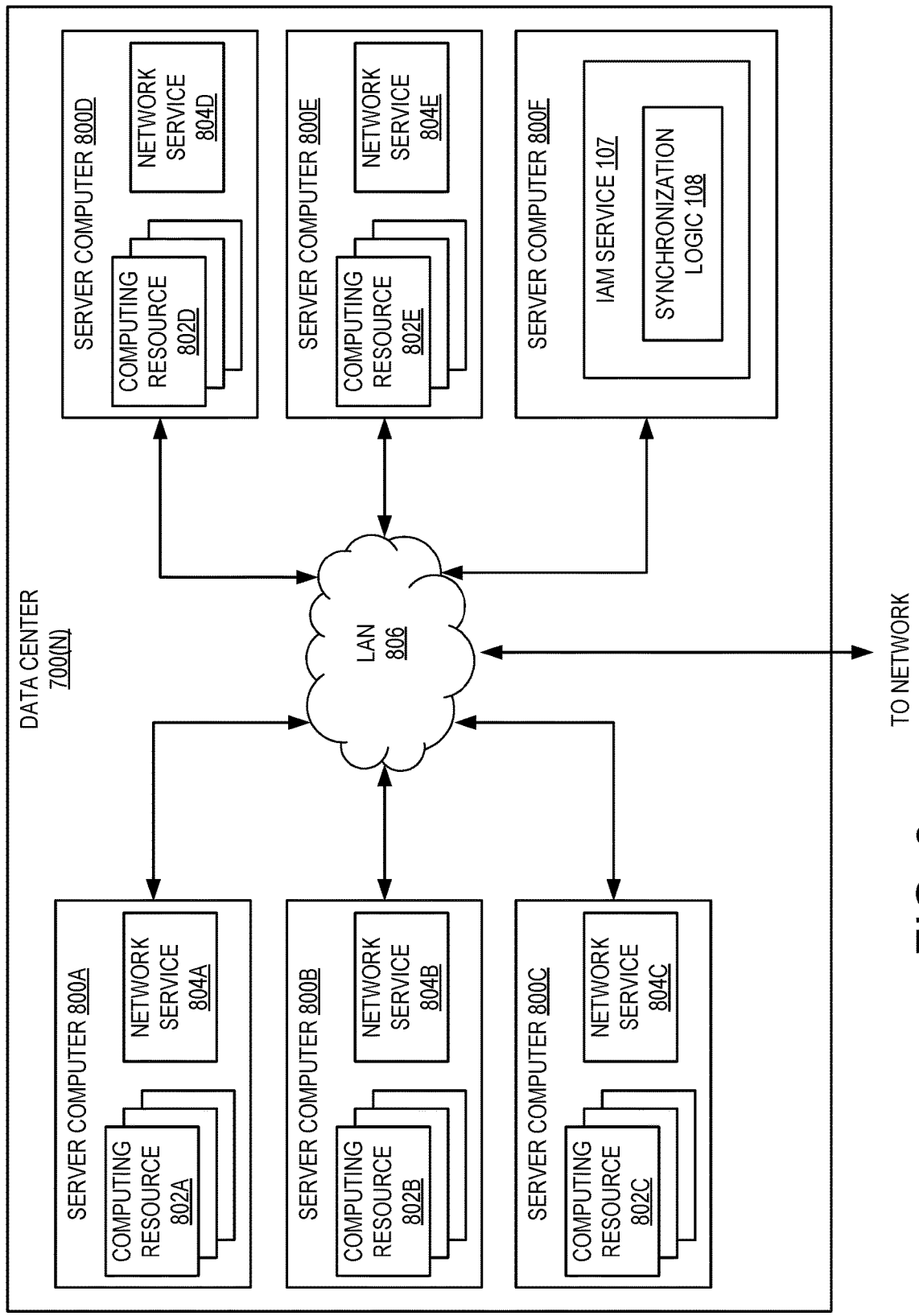
FIG. 8 is a computing system diagram that illustrates one configuration for a data center that can be utilized to implement the IAM service, and in particular the synchronization logic, and/or any other network services disclosed herein.

FIG. 8 is a computing system diagram that illustrates one configuration for a data center 700(N) that can be utilized to implement the IAM service 107, and in particular the synchronization logic 108, as described above, and/or any other network services disclosed herein. The example data center 700(N) shown in FIG. 8 includes several server computers 800A-800E (collectively 800) for providing computing resources 802A-802E (collectively 802), respectively. Each server computer 800A-E may correspond to computer system 600 of FIG. 6 in an embodiment.

The server computers 800 can be standard tower, rackmount, or blade server computers configured appropriately for providing the various computing resources described herein (illustrated in FIG. 8 as the computing resources 802A-802E). As mentioned above, the computing resources 802 provided by the system, or a larger system of which the system is a part, can include, without limitation, analytics applications, data storage resources, data processing resources such as VM instances or hardware computing systems, database resources, networking resources, and others. Some of the servers 800 can also be configured to execute network services 804A-804E (collectively 804) capable of instantiating, providing and/or managing the computing resources 802.

The data center 700(N) shown in FIG. 8 also includes a server computer 800F that can execute some or all of the software components described above. Server computer 800F may correspond to computer system 600 of FIG. 6 in an embodiment. For example, and without limitation, the server computer 800F can be configured to execute the IAM service 107 and in particular the synchronization logic 108, which in some implementations may be separate from the IAM service 107. The server computer 800F can also be configured to execute other components and/or to store data for providing some or all of the functionality described herein. In this regard, it should be appreciated that components or different instances of the IAM service 107 can execute on many other physical or virtual servers in the data centers 800 in various configurations.

In the example data center 700(N) shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802A-E in each of the data centers 700. It should be appreciated that the configuration of the data center 800 described with reference to FIG. 8 is merely illustrative and that other implementations can be utilized.

Figure 9:
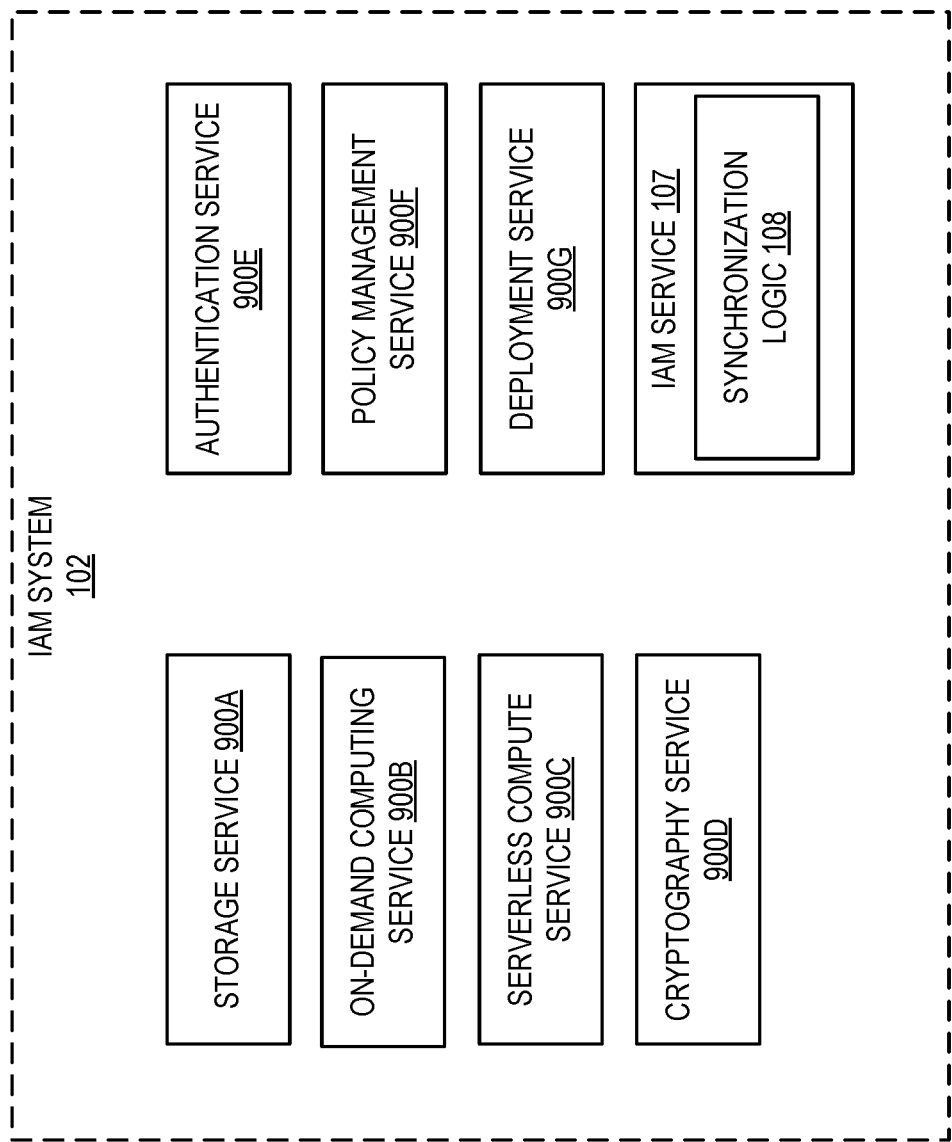
FIG. 9 is a network services diagram that shows aspects of several services that can be provided by and utilized within the IAM system, or a larger system of which the IAM system is a part, which is configured to implement the various technologies disclosed herein.

FIG. 9 is a network services diagram that shows aspects of several services that can be provided by and utilized within the IAM system 102, or a larger system of which the IAM system 102 is a part, which is configured to implement the various technologies disclosed herein. In particular, and as discussed above, the system, or a larger system of which the system is a part, can provide a variety of network services to users and other users including, but not limited to, the IAM service 107 (including synchronization logic 108), a storage service 900A, an on-demand computing service 900B, a serverless compute service 900C, a cryptography service 900D, an authentication service 900E, a policy management service 900F, and a deployment service 900G. The system, or a larger system of which the system is a part, can also provide other types of network services, some of which are described below.

It is also noted that not all configurations described include the network services shown in FIG. 9 and that additional network services can be provided in addition to, or as an alternative to, the services explicitly described herein. Each of the services shown in FIG. 9 can also expose web service interfaces that enable a caller to submit appropriately configured API calls to the various services through web service requests. The various web services can also expose graphic user interfaces (GUIs), command line interfaces (CLIs), and/or other types of interfaces for accessing the functionality that they provide. In addition, each of the services can include service interfaces that enable the services to access each other. Additional details regarding some of the services shown in FIG. 9 will now be provided.

The storage service 900A can be a network-based storage service that stores data obtained from users of the system, or a larger system of which the system is a part. The data stored by the storage service 900A can be obtained from computing devices of users.

The on-demand computing service 900B can be a collection of computing resources configured to instantiate VM instances and to provide other types of computing resources on demand. For example, a user of the system, or a larger system of which the system is a part, can interact with the on-demand computing service 900B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 900B is shown in FIG. 9, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 900C is a network service that allows users to execute code (which might be referred to herein as a "function") without provisioning or managing server computers in the system, or a larger system of which the system is a part. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 900D. The cryptography service 900D can utilize storage services of the system, or a larger system of which the system is a part—such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein.

The system, or a larger system of which the system is a part, in various configurations, also includes an authentication service 900E and a policy management service 900F. The authentication service 900E, in one example, is a computer system (i.e., collection of computing resources 802) configured to perform operations involved in authentication of users or customers. For instance, one of the services shown in FIG. 9 can provide information from a user or customer to the authentication service 900E to receive information in return that indicates whether or not the requests submitted by the user or the customer are authentic.

The policy management service 900F, in one example, is a network service configured to manage policies on behalf of users or customers of the system, or a larger system of which the system is a part. The policy management service 900F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like. In some embodiments, authentication service 900E and policy management service 900F are sub-services within IAM service 107.

The system, or a larger system of which the system is a part, can additionally maintain other network services based, at least in part, on the needs of its customers. For instance, the system, or a larger system of which the system is a part, can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The system, or a larger system of which the system is a part, can also be configured with other network services not specifically mentioned herein in other configurations.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "adding", "receiving", "storing", "generating", "sending", "performing", "writing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer implemented method, executed by one or more hardware processors, method comprising:
   receiving a first command to add an access management tag to a user profile in an identity access management (IAM) system comprising a first database, the access management tag comprising a key value pair that defines an access privilege associated with the user profile, wherein the user profile is associated with at least one of a user, a role, or a group of users, and wherein the access privilege defines an access authorization by the user, the role, or the group of users to a computing resource;
sending a validation request for the access management tag to a tagging system comprising a second database;
receiving a positive validation response from the tagging system, wherein the positive validation response comprises a validation token and indicates that the access management tag satisfies validation criteria of the tagging system;
generating the access management tag by the IAM system;
storing the access management tag in the first database;
storing the validation token in the first database;
adding an entry for the access management tag in a synchronization table in the first database, wherein the entry lacks a synchronized flag;
performing, by the one or more hardware processors, a synchronization process between the first database and the second database;
determining that the entry of the synchronization table lacks the synchronized flag;
sending a request for the tagging system to write a copy of the access management tag to the second database, wherein the request comprises the validation token; and
setting the synchronized flag for the entry in the synchronization table.

2. The computer implemented method of claim 1, further comprising:
receiving, by the IAM system, a second command to modify the access management tag;
sending a new validation request for the access management tag to the tagging system;
receiving a new positive validation response from the tagging system, wherein the new positive validation response comprises a new validation token and indicates that the access management tag, after modification, would satisfy the validation criteria of the tagging system;
modifying the access management tag in the first database;
unsetting the synchronized flag for the entry in the synchronization table in the first database;
repeating the synchronization process between the first database and the second database;
determining that the entry of the synchronization table lacks the synchronized flag;
sending a second request for the tagging system to modify the copy of the access management tag in the second database, the second request comprising the new validation token; and
setting the synchronized flag for the entry in the synchronization table.

3. The computer implemented method of claim 1, wherein the first database comprises an identifier field that is not included in the second database and a name field that is included in the second database, wherein values for the name field are unique in the second database but are not unique in the first database, the method further comprising:
receiving, by the IAM system, a second command to modify a name for the access management tag;
sending a new validation request for the access management tag to the tagging system;
receiving a new positive validation response from the tagging system, wherein the new positive validation response indicates that the access management tag, after modification, would satisfy the validation criteria of the tagging system;
modifying the name for the access management tag in the first database;
unsetting the synchronized flag for the entry in the synchronization table;
setting an updated name flag for the entry in the synchronization table;
repeating the synchronization process between the first database and the second database;
determining that the entry of the synchronization table lacks the synchronized flag and includes the updated name flag;
deleting the copy of the access management tag in the second database;
writing a new copy of the access management tag having the modified name to the second database;
unsetting the updated name flag for the entry in the synchronization table; and
setting the synchronized flag for the entry in the synchronization table.

4. The computer implemented method of claim 1, further comprising:
receiving, by the IAM system, a second command to delete the user profile;
deleting the user profile from the first database;
deleting the access management tag from the first database;
setting a deleted resource flag for the entry in the synchronization table;
unsetting the synchronized flag for the entry in the synchronization table;
repeating the synchronization process between the first database and the second database;
determining that the entry of the synchronization table lacks the synchronized flag and includes the deleted resource flag;
deleting the copy of the access management tag from the second database; and
deleting the entry from the synchronization table.

5. A computer implemented method, executed by one or more hardware processors, the method comprising:
receiving a first command to add a tag to a user profile in a first database, the tag comprising a key value pair that defines an access privilege associated with the user profile, wherein the user profile is associated with a user, a role, or a group of users, and wherein the access privilege defines an access authorization by the user, the role, or the group of users to a computing resource;
determining that the tag satisfies validation criteria associated with a second database, comprising:
sending a validation request for the tag to a system associated with the second database; and
receiving a positive validation response from the system, wherein the positive validation response comprises a validation token and indicates that the tag satisfies validation criteria of the system;
storing the tag in the first database;
adding an entry for the tag in a synchronization table, wherein the entry lacks a synchronized flag;

performing, by the one or more hardware processors, a synchronization process between the first database and the second database;
determining that the entry of the synchronization table lacks the synchronized flag;
causing a copy of the tag to be written to the second database; and
setting the synchronized flag for the entry in the synchronization table.

6. The computer implemented method of claim 5, further comprising:
receiving a second command to modify the tag;
determining that the tag, after modification, satisfies the validation criteria associated with the second database;
modifying the tag in the first database;
unsetting the synchronized flag for the entry in the synchronization table; and
repeating the synchronization process between the first database and the second database.

7. The computer implemented method of claim 6, further comprising:
determining that the entry of the synchronization table lacks the synchronized flag;
modifying the copy of the tag in the second database; and
setting the synchronized flag for the entry in the synchronization table.

8. The computer implemented method of claim 5, wherein the first database comprises a identifier field that is not included in the second database and a name field that is included in the second database, wherein values for the name field are unique in the second database but are not unique in the first database, the method further comprising:
receiving a second command to modify a name for the tag;
determining that the tag, after modification, satisfies the validation criteria associated with the second database;
modifying the name for the tag in the first database;
deleting the copy of the tag in the second database; and
writing a new copy of the tag having the modified name to the second database.

9. The computer implemented method of claim 8, further comprising:
unsetting the synchronized flag for the entry in the synchronization table based on the modifying of the name;
setting an updated name flag for the entry in the synchronization table based on the modifying of the name;
repeating the synchronization process between the first database and the second database;
determining that the entry of the synchronization table lacks the synchronized flag and includes the updated name flag, wherein the copy of the tag is deleted from the second database and the new copy of the tag is written to the second database responsive to determining that the entry of the synchronization table lacks the synchronized flag and includes the updated name flag;
unsetting the updated name flag for the entry in the synchronization table; and
setting the synchronized flag for the entry in the synchronization table.

10. The computer implemented method of claim 5, further comprising:
receiving a second command to delete the user profile;
deleting the user profile from the first database;
deleting the tag from the first database;
deleting the copy of the tag from the second database; and
deleting the entry from the synchronization table.

11. The computer implemented method of claim 10, further comprising:
setting a deleted resource flag for the entry in the synchronization table;
unsetting the synchronized flag for the entry in the synchronization table;
repeating the synchronization process between the first database and the second database; and
determining that the entry of the synchronization table lacks the synchronized flag and includes the deleted resource flag, wherein the copy of the tag is deleted from the second database responsive to determining that the entry of the synchronization table lacks the synchronized flag and includes the deleted resource flag.

12. The computer implemented method of claim 5, wherein the first database is associated with an identity access management (IAM) system and the second database associated with a tagging system, the method further comprising:
translating the tag from a first format used by the first database to a second format used by the second database.

13. The computer implemented method of claim 5, further comprising:
storing the tag in a read replica of the first database; and
reading the tag from the read replica of the first database in order to write the copy of the tag to the second database.

14. The computer implemented method of claim 5, further comprising:
periodically performing the synchronization process between the first database and the second database;
for each performance of the synchronization process, performing the following comprising:
reading the synchronization table to identify entries in the synchronization table that lack the synchronized flag; and
for each entry in the synchronization table that lacks the synchronized flag, performing at least one of a) writing a copy of a tag associated with that entry to the second database or b) updating the copy of the tag associated with that entry in the second database.

15. The computer implemented method of claim 5, wherein the computing resource comprises at least one of a data storage resource, a database, a streaming resource, or a virtual or remote desktop or device.

16. A system comprising:
an identity access management (IAM) system comprising a first processing device and a first database;
a tagging system comprising a second processing device and a second database;
wherein the first processing device of the IAM system is to:
receive a first command to add a tag to a user, a role or a group of users in the first database, the tag comprising a key value pair that defines an access privilege that defines authorization access by the user, the role or the group of users to a computing resource;
send a validation request for the tag to the second processing device of the tagging system;
receive a positive validation response from the second processing device, wherein the positive validation response indicates that the tag satisfies validation criteria of the tagging system;
store the tag in the first database;

add an entry for the tag in a synchronization table; and perform a synchronization process between the first database and the second database, wherein the entry for the tag in the synchronization table initially lacks a synchronized flag, wherein the first processing device is further to;

determine that the entry of the synchronization table lacks the synchronized flag;

provide a copy of the tag to the second processing device for storage in the second database; and set the synchronized flag for the entry in the synchronization table.

17. The system of claim 16, wherein the positive validation response comprises a validation token, and wherein the first processing device is further to:

provide the validation token to the second processing device along with the copy of the tag.

18. The system of claim 16, wherein the first processing device is further to:

receive a second command to modify the tag;

send a new validation request for the tag to the second processing device;

receive a new positive validation response from the second processing device, wherein the new positive validation response indicates that the tag, after modification, would satisfy the validation criteria of the tagging system;

modify the tag in the first database;

unset the synchronized flag for the entry in the synchronization table;

repeat the synchronization process between the first database and the second database;

determine that the entry of the synchronization table lacks the synchronized flag during the synchronization process;

instruct the second processing device to modify the copy of the tag in the second database as part of the synchronization process; and set the synchronized flag for the entry in the synchronization table.

* * * * *